3,364,815
AUTOMATIC FOCUS SYSTEM
Richard H. Smith, North Canton, and Jay N. Burns, Akron, Ohio, assignors to Goodyear Aerospace Corporation, Akron, Ohio, a corporation of Delaware
Filed Feb. 19, 1965, Ser. No. 434,024
7 Claims. (Cl. 88—24)

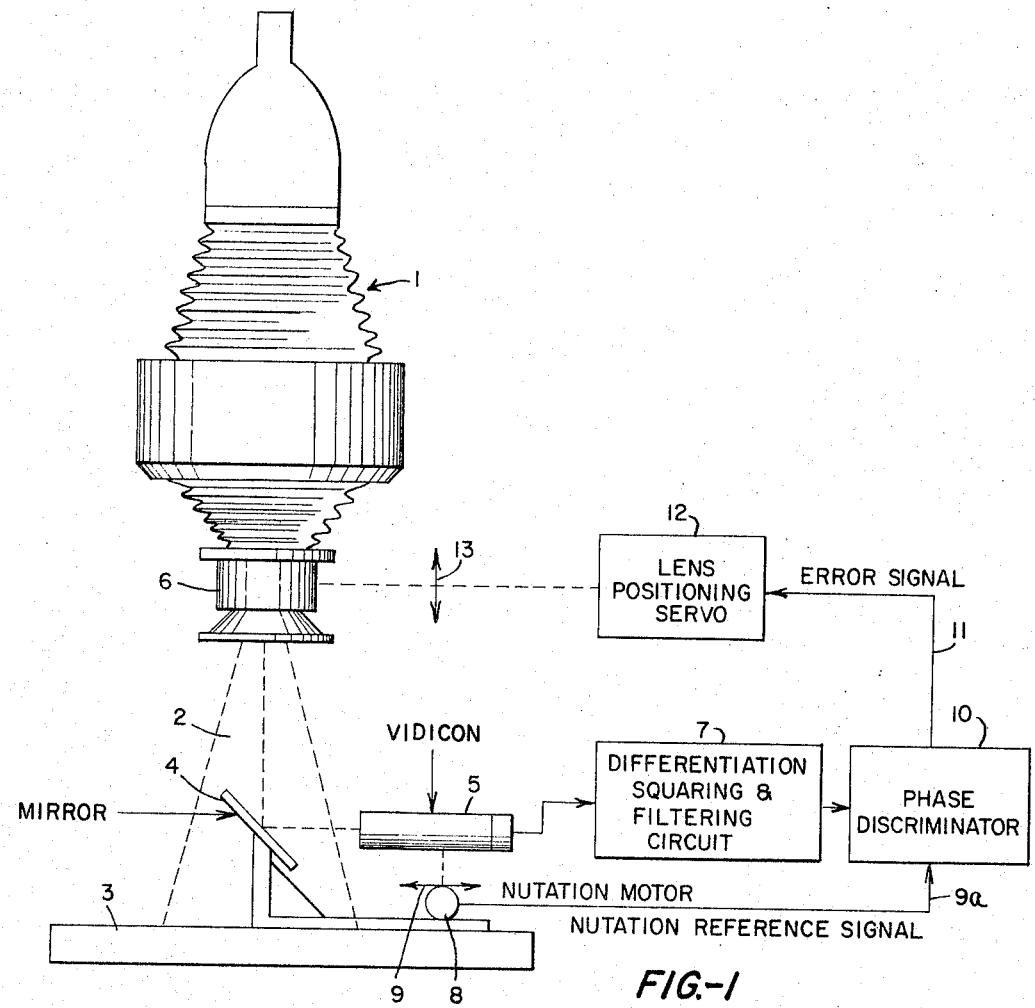
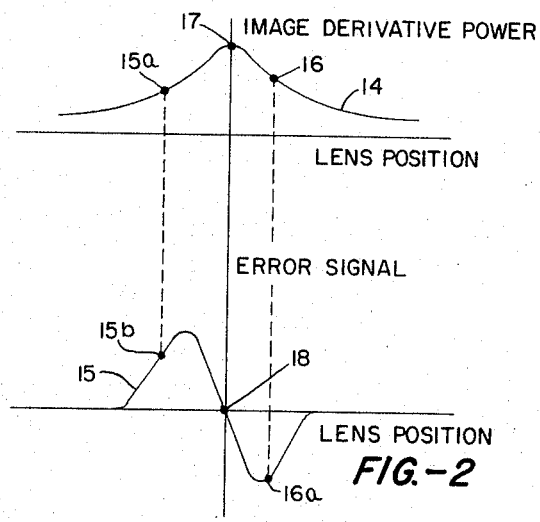

ABSTRACT OF THE DISCLOSURE

An automatic focus control system which evaluates a projected image in terms of its derivative power by viewing the entire image as it is moved into and out of focus, differentiating, and squaring such total information, and detecting when the final output signal is at a maximum, indicating the maximum derivative power, which represents the best focus condition. Any suitable optical pickup moved into and out of focus with respect to the image can provide the optical input information for differentiation. A phase discriminator utilized in combination with the differentiation and squaring circuit determines at what point optimum focus or maximum derivative power occurs.

---

This invention relates to an automatic focus control system, and more particularly to a system which will automatically obtain and maintain optimum focus of an image by evaluating the image in terms of its derivative power.

In high acuity camera systems whose function is to obtain high resolution photographs, the condition of optimum focus is critical with respect to the lens-film distance. The focusing accuracy must be held to within about 0.0005 inch in order to permit a picture resolution of one arc-second. In a camera, the focus of an image is effected by the lens-film distance and also by the lens-object distance. Pressure, temperature, and other factors which cause changes in the lens-film distance of as little as a few ten thousandths of an inch may significantly reduce the focus quality of the picture. Also, since the lens itself might change under the influence of the environment, the task of measuring and maintaining a fixed distance between the principal point of the lens and the film is extremely difficult. In addition, the object distance may not be accurately controlled in an unattended reconnaissance vehicle. The process of focusing a projection system by eye is an uncertain operation. Evidence of optimum focus is observed only in passing through it, so the desired adjustment is an interpolation between two bracketing positions recognized by the eye as less than best focus. Further, limitations of the eye preclude a resolving image detail in excess of about ten lines per millimeter without additional magnification whereas enlargers are required to produce images of 100 lines per millimeter or greater as the quality of the camera systems improves. Thus, a focus sensing device which may be used in an automatic focus control system becomes extremely desirable.

Three general areas which appear to be most highly receptive to the automatic focus control system are (1) high acuity cameras such as used in orbiting reconnaissance systems or reconnaissance drones and aircraft, (2) precision enlargers in which reproduction of high resolution photographs is required with minimum degradation, and (3) picture projectors which are frequently plagued with defocusing action caused by the film "popping" due to heat from the light source.

It is the general object of the invention to avoid and overcome the foregoing and other difficulties of prior art practices by the provision of an automatic focus control system which utilizes well known scanning techniques to obtain focus information and which evaluates the scanned information in terms of its derivative power to achieve the optimum point of focus. It may be shown mathematically that the optimum focus of an image occurs when the derivative power of the scene is maximized through focusing.

A further object of the invention is to provide an automatic focus control system which can readily be adapted to most any type of image focusing system, and which provides constant automatic focusing to maintain an optimum focus regardless of object-lens distance, temperature, pressure, or other outside factors.

Another object of the invention is to provide an automatic focus control system which is relatively simple, easy to fabricate, low in cost, and which provides a continuous optimum focus of the image desired.

The aforesaid objects of the invention and other objects which will become apparent as the description proceeds are achieved by providing in an automatic focus system for focus control of an image the combination of means to scan the image to obtain a current signal proportional to the intensity of the image along the path of scan, means to electronically differentiate, square and integrate the current signal to measure the derivative power of the image, and means to adjust the focus of the image until the derivative power of the image is at a maximum.

For a better understanding of the invention, reference should be had to the accompanying drawings, wherein:

FIGURE 1 is a block diagram of apparatus comprising one embodiment of the invention; and FIGURE 2 is a comparison graph of the image intensities compared to the first derivative signal thereof to show how the difference in the signals may be used to position the lens in order to control the focus of the image.

A backlighted image may be viewed to detect the total light it emits and represent this light as an electrical signal. The power of of such an electrical signal will not vary as the focus of the image is varied as long as the total image or one area of the same size is viewed. However, the derivative of the image intensity or power function may be taken by Parseval's theorem, and this, hereinafter called the derivative power, varies according to focus, and in fact is a maximum at the best focus condition. The description hereinafter sets forth the equipment necessary to achieve the derivative power, and how to apply it to obtain the best focus condition.

With reference to FIGURE 1, the numeral 1 indicates a typical enlarger to project an image 2 onto a surface 3. A mirror 4 is placed to reflect a small portion of the image 2 into a vidicon 5. Thus, the vidicon 5 and the mirror 4, in combination, become the sensing element of the invention. The mirror 4 is so arranged that the optical distance from the lens 6 of the projector 1 to the vidicon 5 is equal to the distance of the lens 6 from the easel 3. Compensation for film thickness can be made by changing the distance between the mirror 4 and the vidicon 5, or by adjusting the height of the mirror above the easel 3.

The vidicon 5 spot scans the image to obtain a measure of the intensity variations of the image along the path of scan. Various scanning sensors could be used such as an image orthicon, a photo multiplier with a mechanical scanner, etc. Also, scanning could be performed by a Ronchi ruling or grating, a Nipkow disc, or discrete or incremental sampling could be utilized. To obtain a measure of derivative energy, the video output of the vidicon 5 is passed to a differentiation, squaring, and filtering circuit 7 where the video output is differentiated by conventional electronic techniques and then squared. The invention contemplates that a full wave rectification rather than a squaring may also be utilized to achieve the results of the invention.

In order to obtain an accurate sensing or gauging of the total derivative information in the image, the output of the circuit 7 is summed over the sampled portion of the image while scanning the beam of the vidicon 5 over this sampled portion of the image. To achieve best focus the point of maximum derivative power must be obtained. In order to determine the point of maximum derivative power and optimum focus, the vidicon may be moved to and from the mirror 4 called nutation or into and out of focus in the direction indicated by the double ended arrow 9. Thus, derivative information is obtained by the above mentioned scanning and summing process at various sensor positions by moving the vidicon to and from the image, i.e., in and out of focus. The ensemble of derivative measurements thus obtained is phase discriminated and an error signal generated such that the lens 6 position that yields maximum derivative energy (i.e. best focused) is selected.

In order to coordinate the output of the filtering circuit 7 which is the derivative power over the sampled portion of image 2 at a particular point of focus with the phase of the nutation of the vidicon, as indicated by arrow 9, a nutation reference signal 9a and the output of the filtering circuit 7 are sent to an electronic phase discriminator 10. The phase discriminator 10 is a standard electronic component well known in the art, and which in this case compares the nutation reference signal (i.e., the in and out of focus movement of the vidicon 5), to the derivative signals from the filtering circuit 7 to determine the direction the lens 6 must move to accomplish best focus. Thus, the phase discriminator produces an error signal 11 which can be used to drive a lens positioning servo 12 which will move the lens 6 up or down, as indicated by the arrow 13, in order to achieve optimum focus.

FIGURE 2 illustrates the curve of derivative power as a function of image focus and the resultant error signal derived as described above. Thus, a curve designated by the numeral 14 may illustrate the derivative power of the image 2 as a function of lens position. The corresponding error signal derived from this curve is shown as curve 15. Suppose the initial focus condition of the vidicon 5 with relation to the lens 6 represents a position 15a on the curve 14. This represents a positive error signal position 15b on the error signal curve 15. This error signal when applied to the lens positioning servo 12, causes the servo to move the lens 6 to a position such that the error signal is zero. This corresponds to point 18 on the error signal curve and point 17 on the image derivative power curve shown in FIGURE 2. As can be seen, when the lens posiiton is such that the error signal is zero, the derivative power as indicated in curve 14 is maximum—thus resulting in optimum focus. Once optimum focus is obtained the mirror 4 may be removed to allow full projection of the image 2 on the easel 3.

Thus, it is seen that the objects of the invention are achieved by providing a vidicon to scan at least a portion of an image to obtain a current signal proportional to the intensity of the image along the path of scan. The beam of the vidicon may be moved over the image to obtain an averaging of intensity of the image to better contrast the focus. The vidicon is also physically moved into and out of optimum focus with this movement phase discriminated with the first derivative power signals resultant from the vidicon output signal being differentiated and squared in a filtering circuit to produce an error signal to position the lens focusing the image. When optimum focus is achieved the mirror may be removed so the image may be projected. In other words, the image is sampled for sensing or gauging the derivative energy of the image with the vidicon moved to change the focus to determine the maximum derivative energy.

While in accordance with the patent statutes, one best known embodiment of the invention has been illustrated and described in detail, it is to be particularly understood that the invention is not limited thereto or thereby, but that the inventive scope is defined in the appended claims.

What is claimed is:

1. In an automatic focus control system the combination of
    means to scan an image to produce a current signal proportional to the intensity of the image along the path of scan,
    means to electronically differentiate, square and integrate the current signal to measure the derivative power of the image, and
    means to adjust the focus of the image until the derivative power of the image is at a maximum.

2. In a system to automatically control the focus of an image the combination of
    means to scan an image to produce a current signal proportional to the intensity of the image along the path of scan,
    means to move the scan over the face of the image relative to the image to make the current signal represent the average intensity of the entire image,
    means to electronically differentiate, square and full wave rectify the current signal to measure the derivative power of the image, and
    means to adjust the focus of said image to maintain the derivative power of the image as nearly maximum as possible.

3. In a system to automatically control the focus of an image the combination of
    means to scan an image to produce a video output current signal proportional to the intensity of the image,
    means to electronically differentiate, square and integrate the current signal to measure the first derivative power of the image,
    focus changing means to change the focus of the image relative to the means to scan the image in a repetitious manner,
    means to phase discriminate the first derivative power of the image to the phase of the focus changing means to determine the position of optimum focus and produce an error signal, and
    means to adjust the focus of the image in accordance with the error signal until the derivative power of the image is at a maximum.

4. In a system to automatically control the focus of an image the combination of
    means to scan an image to produce a video output current signal proportional to the intensity of the image,
    means to electronically differentiate, square and full wave rectify the current signal to measure the first derivative power of the image,
    focus changing means to change the focus of the image relative to the means to scan the image in a repetitious manner,
    means to phase discriminate the first derivative power of the image to the phase of the focus changing means to determine the position of optimum focus and produce an error signal, and
    means to adjust the focus of the image in accordance with the error signal until the derivative power of the image is at a maximum.

5. In a system to automatically control the focus of an image the combination of
    means to project the image onto a surface, scanning means to scan the projected image to gauge the first derivative power thereof,
    means to move the image into and out of focus on the scanning means, and
    means to determine the position of the image relative to the scanning means when maximum derivative energy is detected by the scanning means.

6. In a system to automatically control the focus of a projected image the combination of scanning means to electronically sample the intensity of the projected image, circuit means receiving an input from the scanning means to gauge the derivative energy of the image, and means to move the scanning means into and out of focus with respect to the image to determine the position of the scanning means relative to the image when maximum derivative energy is detected by the circuit means.

7. In a system to automatically control the focus of an image the combination of a lens to focus a projected image, a screen located at spaced relation to the lens to receive the projected image, scanning means to view the image at a null position being the same distance as the lens to screen distance to produce a current signal representing the intensity of the image, means to move the scanning means in a constant nutation movement to and from the lens about the null position, means to electronically differentiate, square, and full wave rectify the current signal to measure the derivative power of the image as viewed by the scanning means, means to phase discriminate the nutation movement of the scanning means to determine when maximum derivative energy is detected by the scanning means to produce an output error signal, and means to position the lens to or from the screen according to the error signal to achieve best image focus on the screen.

References Cited

UNITED STATES PATENTS 2,999,436  9/1961  Faulhaber _____ 88—24

NORTON ANSHER, *Primary Examiner.*

R. A. WINTERCORN, *Assistant Examiner.*